(12) United States Patent
Tabacchi et al.

(10) Patent No.: US 11,585,374 B2
(45) Date of Patent: Feb. 21, 2023

(54) TURBOMACHINE WITH AIR FOIL BEARING RETAINER ARRANGEMENT

(71) Applicant: Garrett Transportation I Inc, Torrance, CA (US)

(72) Inventors: Luca Tabacchi, Redondo Beach, CA (US); Scott Aguilar, La Crescenta, CA (US)

(73) Assignee: GARRETT TRANSPORTATION I INC, Torrance, CA (US)

( * ) Notice: Subject to any disclaimer, the term of this patent is extended or adjusted under 35 U.S.C. 154(b) by 29 days.

(21) Appl. No.: 17/301,770

(22) Filed: Apr. 14, 2021

(65) Prior Publication Data

US 2022/0333638 A1    Oct. 20, 2022

(51) Int. Cl.
*F16C 17/02* (2006.01)
*F16C 27/02* (2006.01)

(52) U.S. Cl.
CPC ............ *F16C 17/024* (2013.01); *F16C 27/02* (2013.01)

(58) Field of Classification Search
CPC .................................................. F16C 17/024
See application file for complete search history.

(56) References Cited

U.S. PATENT DOCUMENTS

| 6,964,522 B2 | 11/2005 | Kang et al. |
| 9,057,401 B2 | 6/2015 | Saville et al. |
| 9,109,622 B2 * | 8/2015 | Meacham ............... F16C 33/02 |
| 9,556,899 B2 | 1/2017 | Saville et al. |
| 9,989,085 B2 | 6/2018 | Saville et al. |
| 2005/0163407 A1 | 7/2005 | Kang et al. |
| 2007/0047858 A1 * | 3/2007 | Hurley .................. F16C 17/024 384/106 |
| 2011/0052110 A1 * | 3/2011 | Kim ...................... F16C 17/024 384/106 |

FOREIGN PATENT DOCUMENTS

| CN | 111795062 | * 10/2020 |
| EP | 2942537 A1 | 11/2015 |

* cited by examiner

*Primary Examiner* — James Pilkington
(74) *Attorney, Agent, or Firm* — Lorenz & Kopf, LLP

(57) ABSTRACT

A journal foil bearing system includes a retainer arrangement with an internal groove extending in a depth direction from the bore of the housing. The internal groove has a first portion and a second portion. The first portion extends further in the depth direction than the second portion and includes a seat surface of the internal groove. The retainer arrangement additionally includes a first top foil end and a second top foil end of the top foil member. The first top foil end is configured to abut the second top foil end to arch-bind the at least one top foil within the bearing system. The first top foil end is received in the first portion of the internal groove and is configured to seat against the seat surface to limit rotation of the first top foil end about the axis. The second top foil end is received in the second portion of the internal groove.

20 Claims, 4 Drawing Sheets

TURBOMACHINE WITH AIR FOIL BEARING RETAINER ARRANGEMENT

TECHNICAL FIELD

The present disclosure generally relates to a turbomachine and, more particularly, relates to a turbomachine with an air foil bearing retainer arrangement.

BACKGROUND

Various bearing systems are provided for supporting rotation of a shaft within a housing. For example, turbomachines (e.g., turbochargers, superchargers, motorized turbomachines, turbogenerators, etc.) may include one or more air bearings. These bearings preferably support efficient rotation of the shaft, across a wide range of operating conditions, and throughout a long operating lifetime.

Some devices include foil bearing systems (i.e., journal foil bearing systems, foil-air bearing systems, air foil journal bearing, etc.). These bearings include one or more foils that are radially disposed between the shaft and the housing, wherein the foil(s) exert an inwardly directed radial pre-load against the shaft when at-rest. The lift-off speed of the bearing is affected by the amount of pre-load applied to the shaft. Furthermore, wear of the bearing is affected by the amount of applied pre-load. Also, the foil(s) are preferably stiff enough to provide acceptable roto-dynamic behavior/shaft motion control throughout the operating speed range of the shaft.

However, tailoring and controlling these factors for conventional foil bearing systems remains challenging. For example, it can be difficult to control certain dimensions of the bearing components, which can cause the pre-load of the foil bearing to be unacceptable. Manufacture of these bearing systems can also be inefficient due to difficulty in controlling these dimensions, due to a large part count, due to assembly difficulties, and/or for other reasons.

Thus, it is desirable to provide a foil bearing system that allows for more precise and selective control of the pre-load that the system applies to the shaft when at-rest. It is also desirable to provide a foil bearing system that provides manufacturing efficiencies. Other desirable features and characteristics of the present disclosure will become apparent from the subsequent detailed description and the appended claims, taken in conjunction with the accompanying drawings and this background discussion.

BRIEF SUMMARY

In one embodiment, a journal foil bearing system is disclosed that includes a journal housing member with a bore. The bearing system also includes a shaft received within the bore and supported for rotation about an axis relative to the journal housing member. Also, the bearing system includes a biasing foil member and a top foil member. The biasing foil member includes at least one biasing foil received within the bore and disposed radially between the journal housing member and the shaft with respect to the axis. The top foil member includes at least one top foil received within the bore and disposed radially between the at least one biasing foil and the shaft with respect to the axis. Moreover, the bearing system includes a retainer arrangement that includes an internal groove that extends in a depth direction from the bore. The internal groove has a first portion and a second portion. The first portion extends further in the depth direction than the second portion and includes a seat surface of the internal groove. The retainer arrangement additionally includes a first top foil end and a second top foil end of the top foil member. The first top foil end is configured to abut the second top foil end to arch-bind the at least one top foil within the bearing system. The first top foil end is received in the first portion of the internal groove and is configured to seat against the seat surface to limit rotation of the first top foil end about the axis. The second top foil end is received in the second portion of the internal groove.

In another embodiment, a journal foil bearing system is disclosed that includes a journal housing member with a bore. The bearing system includes a shaft received within the bore and supported for rotation about an axis relative to the journal housing member. The bearing system also includes a biasing foil member and a top foil member. The biasing foil member includes at least one biasing foil received within the bore and disposed radially between the journal housing member and the shaft with respect to the axis. The top foil member includes at least one top foil received within the bore and disposed radially between the at least one biasing foil and the shaft with respect to the axis. The bearing system further includes a retainer arrangement. The retainer arrangement includes an internal groove of the journal housing that extends from the bore. The internal groove has a seat surface. The retainer arrangement also includes a first top foil end and a second top foil end of the top foil member. The first top foil end and the second top foil end extend substantially parallel with the first top foil end extending further than the second top foil end outward from the axis to define a foil seating part of the first top foil end. The first top foil end is configured to abut the second top foil end to arch-bind the at least one top foil within the bearing system. The first top foil end and the second top foil end are received in the internal groove with the seating part configured to seat against the seat surface to limit rotation of the first top foil end about the axis.

In an additional embodiment, a method of manufacturing a journal foil bearing system is disclosed that includes providing a journal housing member with a bore and an internal groove that extends in a depth direction from the bore. The internal groove has a first portion and a second portion. The first portion extends further in the depth direction than the second portion and includes a seat surface. The method also includes inserting a shaft within the bore and supporting the shaft with a foil arrangement for rotation about an axis relative to the journal housing member. The foil arrangement includes a biasing foil member and a top foil member. The biasing foil member includes at least one biasing foil received within the bore and disposed radially between the journal housing member and the shaft with respect to the axis. The top foil member includes at least one top foil received within the bore and disposed radially between the at least one biasing foil and the shaft with respect to the axis. Moreover, the method includes retaining the top foil member, including abutting a first top foil end and a second top foil end of the top foil member to arch-bind the at least one top foil within the bearing system, positioning the first top foil end in the first portion of the internal groove, seating the first top foil end against the seat surface to limit rotation of the first top foil end about the axis, and positioning the second top foil end in the second portion of the internal groove.

BRIEF DESCRIPTION OF THE DRAWINGS

The present disclosure will hereinafter be described in conjunction with the following drawing figures, wherein like numerals denote like elements, and wherein.

DETAILED DESCRIPTION

Figure 1:
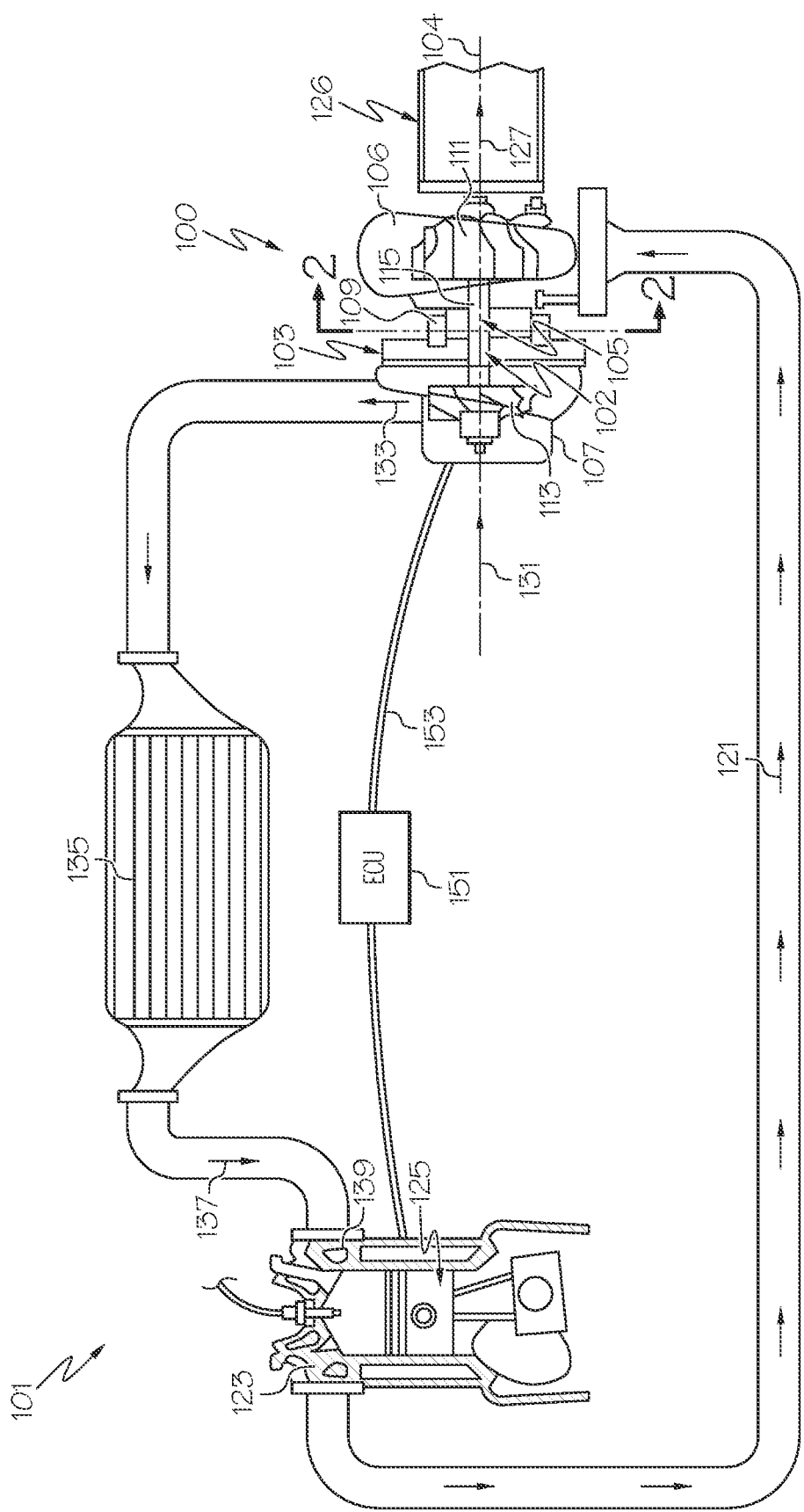
FIG. 1 is a schematic illustration of an engine system with a turbocharger that includes a bearing system according to example embodiments of the present disclosure.

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include an improved journal foil bearing system and improved processes for manufacturing the same. The bearing may be provided with known, selected characteristics that are precisely controlled. The foil bearing system of the present disclosure also includes a relatively low part count and may be efficiently manufactured.

In some embodiments, a bearing housing includes a bore that receives a shaft, and the foil bearing system includes a biasing foil and top foil members that extend about the shaft in a circumferential direction with respect to its axis of rotation. The biasing and top foil members may also be radially disposed between the shaft and the bearing housing.

The foil bearing system may also include a retainer arrangement for one or more of the foil members. The retainer arrangement may include an internal groove that extends radially in a depth direction from the bore. The groove may receive ends of the top foil member to limit the top foil member against rotation about the axis. The groove may also receive ends of the biasing foil member to limit the biasing foil member against rotation about the axis.

In some embodiments, the groove may include a first portion and a second portion. The first and second portions may be connected (i.e., open to each other, in communication, etc.) to receive the ends of the top foil member. The first and second portions may have different sizes, different cross-sectional shapes, different cross-sectional profiles, etc.

The groove may further include a seat surface. The seat surface may be a substantially flat surface. The seat surface may separate, demarcate, separate, etc. the first portion of the groove from the second portion of the groove. For example, the first portion of the groove may extend further in a depth direction than the second portion to define the seat surface.

Additionally, in some embodiments, one end of the top foil member may extend out further than the other end of the top foil member. The projecting portion (i.e., a seating portion of the top foil member) may seat against the seating surface of the groove to limit rotation of that end (e.g., the trailing end) of the top foil member with respect to the axis of rotation.

In at least some embodiments, the ends of the top foil member may overlap, abut, and bear upon itself. More specifically, the ends may exert a load directed away from each other in the circumferential, tangential, and/or hoop direction with respect to the axis. Because of this load, the top foil may be considered to be in an arch-bound condition.

The arch-bound top foil member may, thus, provide a selected pre-load on the shaft. The arch-bound top foil member may provide other selected characteristics, such as a relatively low break-away torque and relatively low lift-off speed for the shaft. Furthermore, the journal foil bearing system of the present disclosure may provide a selected operational spring stiffness while limiting the amount of bearing pre-load when the shaft is at-rest.

It will be appreciated that the arch-bound condition of the top foil member provides various advantages. The top foil member may, for example, include a single foil with a first end, a second end, and an intermediate portion that extends circumferentially between the first and second ends. This may be a useful and uncomplicated configuration for the foil bearing system. The performance characteristics of the foil bearing system may be selected and controlled with precision because of the arch-bound condition of the top foil member. The arc length of the intermediate portion may be precisely controlled to thereby control the loading of the top foil member.

The internal groove may also be highly manufacturable. For example, at least some (e.g., all of) the internal surfaces of the groove may be relatively flat for increasing manufacturability. Also, the first and/or second portions of the groove may be substantially polygonal in cross section. The first and/or second portions may be substantially rectangular in cross section. The first portion may extend further in the depth direction than the second portion to define a flat seat surface.

The groove may be manufactured in a number of ways without departing from the scope of the present disclosure. For example, in some embodiments, at least part of the groove may be machined by removing material from the bearing housing. Furthermore, in some embodiments, a broaching tool may be utilized to form the groove. The tool may broach the groove in a single pass of the broaching tool in some embodiments. Once the groove is formed, the foil arrangement may be positioned around the shaft and the ends of the foil(s) may be positioned within the internal groove. This manufacturing and assembly may, thus, be performed with high efficiency and at reduced costs.

Moreover, the groove of the present disclosure may facilitate assembly of the biasing foil in some embodiments. In addition to the groove described above (i.e., a first groove), the bearing housing may include another groove (i.e., a second groove) having a different cross sectional profile. The biasing foil member may include a plurality foils with respective ends that are received within the first and second grooves. However, the different shapes of the grooves may ensure that the foils of the biasing foil member are installed in the correct orientation. Thus, the retainer arrangement of the present disclosure may increase assembly efficiency.

FIG. 1 is a schematic view of an example turbomachine, such as a turbocharger 100 that is incorporated within an engine system 101. The turbocharger 100 may include one or more features of the present disclosure. It will be appreciated that the turbocharger 100 could be another turbomachine, such as a supercharger, a compressor device, an electric-motor-driven turbomachine, etc. in additional embodiments of the present disclosure. Furthermore, the turbomachine of the present disclosure may be incorporated into a number of systems other than an engine system without departing from the scope of the present disclosure.

The turbocharger 100 may include a housing 103 and a rotating group 102, which is supported within the housing 103 for rotation about an axis 104 by a bearing system 105.

The bearing system 105 may include and/or define at least one air journal foil bearing as will be discussed. It will be appreciated that the air journal foil bearing system 105 may be included in another turbomachine (e.g., an electrically motorized e-compressor, a generator, a compressor device for a fuel-cell system, etc.) without departing from the scope of the present disclosure.

As shown in the illustrated embodiment, the housing 103 may include a turbine housing 106, a compressor housing 107, and a bearing housing 109. The bearing housing 109 may be disposed between the turbine and compressor housings 106, 107.

Additionally, the rotating group 102 may include a turbine wheel 111, a compressor wheel 113, and a shaft 115. The turbine wheel 111 is located substantially within the turbine housing 106. The compressor wheel 113 is located substantially within the compressor housing 107. The shaft 115 extends along the axis of rotation 104, through the bearing housing 109, to connect the turbine wheel 111 to the compressor wheel 113. Accordingly, the turbine wheel 111 and the compressor wheel 113 rotate together as a unit about the axis 104.

The turbine housing 106 and the turbine wheel 111 cooperate to form a turbine (i.e., turbine section, turbine stage) configured to circumferentially receive a high-pressure and high-temperature exhaust gas stream 121 from an engine, e.g., from an exhaust manifold 123 of an internal combustion engine 125. The turbine wheel 111 and, thus, the other components of the rotating group 102 are driven in rotation around the axis 104 by the high-pressure and high-temperature exhaust gas stream 121, which becomes a lower-pressure and lower-temperature exhaust gas stream 127 that is released into a downstream exhaust pipe 126.

The compressor housing 107 and compressor wheel 113 form a compressor (i.e., compressor section, compressor stage). The compressor wheel 113, being driven in rotation by the exhaust-gas driven turbine wheel 111, is configured to compress received input air 131 (e.g., ambient air, or already-pressurized air from a previous-stage in a multi-stage compressor) into a pressurized airstream 133 that is ejected circumferentially from the compressor housing 107. The compressor housing 107 may have a shape (e.g., a volute shape or otherwise) configured to direct and pressurize the air blown from the compressor wheel 113. Due to the compression process, the pressurized air stream is characterized by an increased temperature, over that of the input air 131.

The pressurized airstream 133 may be channeled through an air cooler 135 (i.e., intercooler), such as a convectively cooled charge air cooler. The air cooler 135 may be configured to dissipate heat from the pressurized airstream 133, increasing its density. The resulting cooled and pressurized output air stream 137 is channeled into an intake manifold 139 of the internal combustion engine 125, or alternatively, into a subsequent-stage, in-series compressor. The operation of the system may be controlled by an ECU 151 (engine control unit) that connects to the remainder of the system via communication connections 153.

Figure 2:
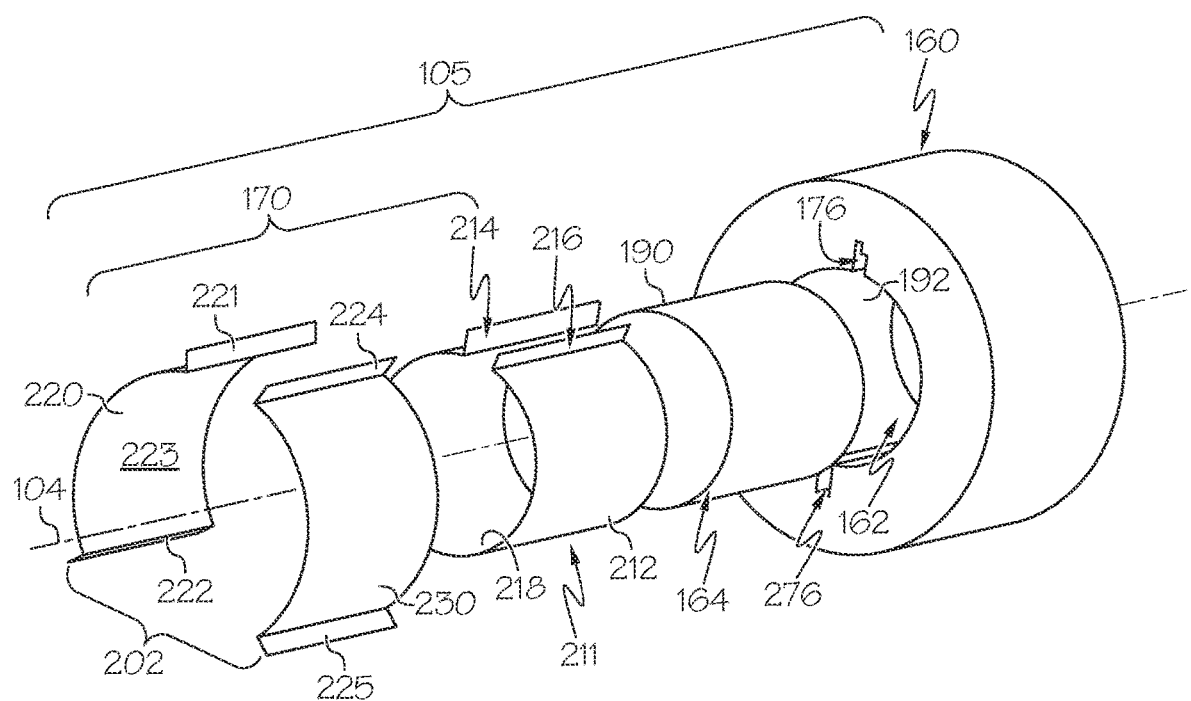
FIG. 2 is a perspective view of the bearing system included, for example, in the embodiments of FIG. 1.
Figure 3:
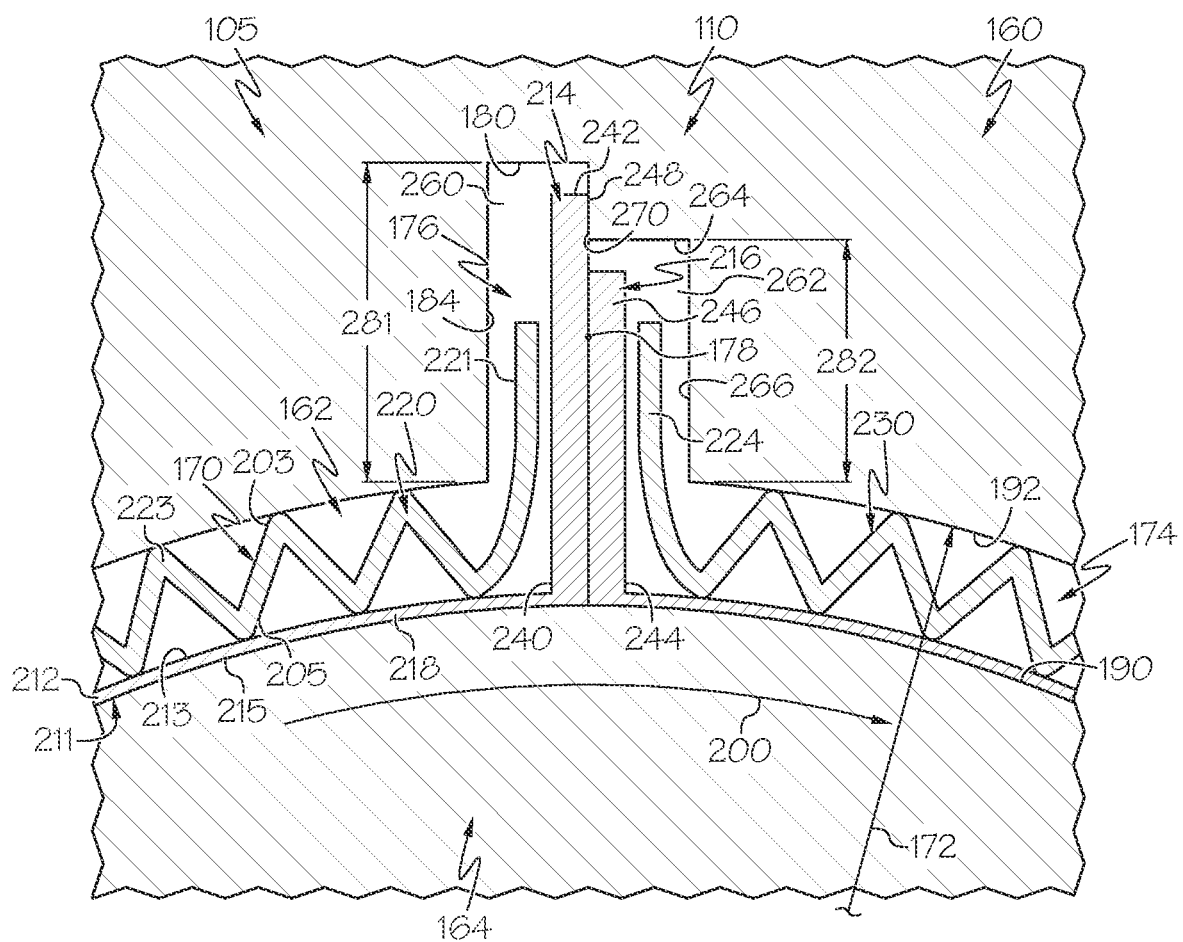
FIG. 3 is a cross-sectional view of a retainer arrangement of the bearing system according to example embodiments of the present disclosure.

Referring now to FIGS. 2 and 3, the bearing system 105 will be discussed in greater detail according to example embodiments. As shown, the bearing system 105 (i.e., bearing arrangement) may be a journal foil bearing system 105. As mentioned, the bearing system 105 may be included in the turbocharger 100 of the type represented in FIG. 1, or the bearing system 105 may be included in another turbomachine without departing from the scope of the present disclosure.

The bearing system 105 may generally include a journal housing member 160 with a bore 162 that receives a segment 164 of the shaft 115. The bearing system 105 may also generally include a foil arrangement 170 disposed radially between the journal housing member 160 and the segment 164 of the shaft 115. The foil arrangement 170 may include one or more foils that support the shaft 115 for rotation relative to the journal housing member 160 as will be discussed. The bearing system 105 may further include a retainer arrangement 110 (FIG. 3), which may, for example, retain and attach the foil arrangement 170 to the journal housing member 160 as discussed in detail below. The retainer arrangement 110 may be effective in retaining the foil arrangement 170, and the retainer arrangement 110 may be robust. Also, the retainer arrangement 110 may provide certain manufacturing advantages.

Components associated with the bearing system 105 will now be individually discussed, starting with the shaft segment 164. As shown in FIG. 2, the shaft segment 164 may be cylindrical, with a solid cross section (i.e., not hollow), and may have a circular cross section taken across the axis 104. The outer diameter surface 190 may be smooth and centered about the axis 104. The shaft segment 164 may be integrally attached to both axial ends of the shaft 115 for coupling the rotating group 102 along the turbine section and the compressor section of the turbocharger 100. The shaft segment 164 may be supported for rotation in the clockwise direction (as indicated by arrow 200) in the perspective of FIG. 3.

The journal housing member 160 is shown in FIG. 2 according to example embodiments. The journal housing member 160 may be fixed relative to (e.g., attached to) a surrounding portion of the bearing housing 109 (FIG. 1). The journal housing member 160 may be integrally attached to another portion of the bearing housing 109. The journal housing member 160 may be an inner area of the bearing housing 109 with the bore 162 extending therethrough. The bore 162 may have a circular cross section with a radius 172 (FIG. 3) that is slightly larger than that of the segment 164 of the shaft 115. Accordingly, an annular gap 174 may be defined between an outer diameter surface 190 of the shaft 115 and an inner diameter surface 192 of the journal housing member 160. The gap 174 may receive the foil arrangement 170. The gap 174 may be dimensioned according to the size, spring stiffness, and/or other characteristics provided by the foil arrangement 170.

The foil arrangement 170 may include a biasing foil member 202 and a top foil member 211. The biasing foil and top foil members 202, 211 may include thin, sheet-like foil strips, sheets, etc. that wrap and extend at least partly about the shaft segment 164 in the circumferential direction about the axis 104. The foil arrangement 170 may be received within the gap 174 as shown in FIG. 3. The foil arrangement 170 is shown in FIG. 3 in a state in which the shaft segment 164 is at rest; however, as will be discussed, the foil arrangement 170 may resiliently flex to accommodate and support rotation of the shaft 115 as will be discussed.

In some embodiments represented in FIG. 2, the biasing foil member 202 of the foil arrangement 170 may include a plurality of biasing foils, such as a first biasing foil 220 and a second biasing foil 230. The first biasing foil 220 may be arcuate and elongate, extending in the circumferential direction between a first end 221 and a second end 222. The first end 221 and the second end 222 may project out radially, and an intermediate portion 223 may arcuately extend about the axis 104. The second biasing foil 230 may be substantially similar, except that the second biasing foil 230 may be inverted and disposed on the opposite side of the axis 104. Accordingly, as shown in FIG. 3, a second end 224 of the second biasing foil 230 may be disposed proximate the first end 221 of the first biasing foil 220. Moreover, a first end 225 of the second biasing foil 230 may be disposed proximate the second end 222 of the first biasing foil 220 when the biasing foil member 202 is positioned about the shaft segment 164.

As shown in FIG. 3, the intermediate portion 223 of the biasing foils 220, 230 may be rippled, corrugated, wavy, or otherwise patterned. The intermediate portion 223 of the biasing foils 220, 230 may be radially disposed between the journal housing member 160 and the top foil member 211. More specifically, the peaks of an outer radial side 203 of the biasing foils 220, 230 may abut against the inner diameter surface 192 of the journal housing member 160, whereas the valleys of an inner radial side 205 of the biasing foils 220, 230 may abut against the top foil member 211.

Referring to FIG. 2, the top foil member 211 may include a single top foil 212 in the foil arrangement 170. Thus, the top foil 212 may include a first end 214 (i.e., a first top foil end), a second end 216 (i.e., a second top foil end), and an intermediate portion 218 that extends circumferentially between the first and second ends 214, 216. The intermediate portion 218 may be rounded and may follow a substantially circular path. The intermediate portion 218 may be radially disposed between the biasing foil member 202 and the outer diameter surface 190 of the shaft segment 164. As stated, the valleys of the rippled biasing foil member 202 may abut an outer radial side 213 of the top foil 212. An inner radial side 215 of the top foil 212 may layer over and abut against the outer diameter surface 190 of the shaft segment 164.

The first and second ends 214, 216 may be substantially flat and planar. The first and second ends 214, 216 may project outward radially from the arcuate intermediate portion 218. The first and second ends 214, 216 may also extend along the axis 104 as shown in FIG. 2. In some embodiments, the first and second ends 214, 216 may extend substantially parallel to each other in the outward, radial direction. The first and second ends 214, 216 may extend radially along a plane that intersects the axis 104; however, in other embodiments, the ends 214, 216 project along a plane that is angled with respect to the axis 104.

Moreover, as shown in FIG. 3, the first end 214 may include an inner radial edge 240 that is connected to the intermediate portion 218 and that is disposed proximate the shaft segment 164. The first end 214 may also include an outer radial edge 242 that disposed outward radially from the shaft segment 164 and that defines one terminal edge of the top foil 212. Likewise, the second end 216 may include an inner radial edge 244 that is connected to the intermediate portion 218 and that is disposed proximate the shaft segment 164. The second end 216 may also include an outer radial edge 246 that disposed outward radially from the shaft segment 164 and that defines the other terminal edge of the top foil 212. As shown, the first end 214 may be longer than the second end 216 in the radial direction and may extend further than the second end 216 in the radially outward direction from the axis 104. As such, a foil seating part 248 of the first end 214 may be defined radially from the outer radial edge 246 of the second end 216 to the outer radial edge 242 of the first end 214.

The first and second ends 214, 216 may be disposed proximate each other at an angular position with respect to the axis 104. As shown in FIG. 3, when the shaft segment 164 is at-rest, the first and second ends 214, 216 may layer over each other and abut in an overlapping arrangement. These ends 214, 216 may bear on each other so as to establish an arch-bound condition. In other words, the single top foil 212 may be an arch-bound top foil 212. Accordingly, the top foil 212 may be provided with effective and precise characteristics for controlling loading in the bearing system 105. It will be appreciated that the top foil member 211 may include a series of top foils (e.g., plural arch-bound top foils) that are arranged end-to-end in the circumferential direction without departing from the scope of the present disclosure.

The first and second ends 214, 216 may define part of the retainer arrangement 110 of the bearing system 105. Furthermore, the retainer arrangement 110 may include one or more grooves (i.e., apertures, openings, etc.) included in the bore 162 of the journal housing member 160. For example, in some embodiments represented in FIG. 2, the journal housing member 160 may include a first internal groove 176 and a second internal groove 276.

As shown, the first internal groove 176 and the second internal groove 276 may be recessed into the journal housing member 160 radially in a depth direction from the inner diameter surface 192 of the bore 162. Also, the first and second internal grooves 176, 276 may be elongate and may extend substantially parallel to the axis of rotation 104 the shaft 115. As shown in FIG. 3, the first internal groove 176 may extend along a longitudinal axis 178 (a first groove axis) that is substantially parallel to the axis of rotation 104 (FIG. 1). The second internal groove 276 may have a respective longitudinal axis that is parallel to the axis 178 and the axis of rotation 104. The second internal groove 276 may be spaced apart angularly about the axis 104 from the first internal groove 176. For example, the first and second internal grooves 176, 276 may be spaced apart on opposite sides of the bore 162 (i.e., spaced apart one-hundred-eighty degrees (180°) with respect to the axis 104).

The first internal groove 176 may have a cross sectional shape which is shown in FIG. 3. This shape may be substantially polygonal and may include a plurality of flat surfaces (e.g., at least four substantially flat surfaces). As shown, the first internal groove 176 may be sub-divided into a first portion 260 and a second portion 262 (i.e., the first internal groove 176 may include and may be defined by the first and second portions 260, 262). The first and second portions 260, 262 may be substantially rectangular in shape and may be connected (i.e., open to each other, in-communication with each other, etc.) on one side.

The first portion 260 may be defined by a substantially flat first recessed surface 180, which may lie in a plane that is substantially parallel with the axis 104 and tangent to an imaginary circle that is centered on the axis 104. The first recessed surface 180 may define a depth dimension 281 of the first portion 260. In other words, the depth dimension 281 may be measured radially from the inner diameter surface 192 to the first recessed surface 180. The first portion 260 may also be defined by a substantially flat first side surface 184, which may extend radially from the inner diameter surface 192 to the first recessed surface 180 (e.g., normal to the first recessed surface 180) to define a side boundary of the first internal groove 176. The first portion 260 may be joined to the second portion 262 on the side opposite that of the first side surface 184.

The second portion 262 may be defined by a substantially flat second recessed surface 264, which may lie in a plane that is substantially parallel with the axis 104 and tangent to an imaginary circle that is centered on the axis 104. The second recessed surface 264 may define a depth dimension 282 of the second portion 262. In other words, the depth dimension 282 may be measured radially from the inner diameter surface 192 to the second recessed surface 264. The second portion 262 may also be defined by a substantially flat second side surface 266, which may extend radially from the inner diameter surface 192 to the second recessed surface 264 (e.g., normal to the second recessed surface 264) to define another side boundary of the first internal groove 176. The second portion 262 may be joined to the first portion 260 on the side opposite that of the second side surface 266.

The first portion 260 may extend further in the depth direction (radially outward) than the second portion 262. In other words, the first radial depth 281 may be greater than the second radial depth 282 such that a seat surface 270 is defined. The seat surface 270 may define part of the first portion 260 of the internal groove 176. The seat surface 270 may be a substantially flat and planar surface and may lie within a plane that intersects the axis 104. The seat surface 270 may face tangentially, may be normal to the first recessed surface 180, and may face toward the first side surface 184.

Accordingly, the cross-section of the first internal groove 176 may include a plurality of rectangular portions 260, 262 having different depth dimensions 281, 282. Although the portions 260, 262 extend radially in a depth direction that is substantially normal to the axis, one or both of the portions 260, 262 may extend radially in the depth direction, but along a different angle. In other words, the portions 260, 262 of the first internal groove 176 may extend depth-wise substantially along a plane that intersects the axis 104 as represented in FIGS. 2 and 3; however, in other embodiments, the groove 176 may extend depth-wise along a plane that is angled with respect to the axis 104. It will also be appreciated that the first and/or second portion 260, 262 may be shaped differently (e.g., to have a polygonal shape with five or more sides, to include one or more contoured surfaces, etc.) without departing from the scope of the present disclosure.

As shown in FIG. 2, the second internal groove 276 may have a different cross-sectional shape than the first internal groove 176. For example, the first internal groove 176 may be generally characterized as having a lower-case "h" cross-sectional shape whereas the second internal groove 176 may be generally characterized as having a rectangular or "U-shaped" cross-sectional shape. The second internal groove 276 may maintain this rectangular shape along a majority of the length of the journal housing member 160.

The first internal groove 176 may receive the first and second ends 214, 216 of the top foil 212 as well as the first end 221 and second end 224 of the biasing foil member 202. The first end 214 of the top foil 212 and the first end 221 of the biasing foil member 202 may be received in the first portion 260 of the first internal groove 176. The second end 216 of the top foil 212 and the second end 224 of the biasing foil member 202 may be received in the second portion 262 of the first internal groove 176.

Furthermore, when the shaft segment 164 is at-rest, the foil seating part 248 of the first end 214 of the top foil 212 may be seated flat on the seat surface 270. The foil seating part 248 may lie flat and overlap the seat surface 270 such that the seat surface 270 supports the foil seating part 248 in the tangential direction. Further inward radially, the first end 214 may overlap, abut, and bear upon the second end 216 of the top foil 212 such that the top foil 212 is retained in the arch-bound condition. Accordingly, the top foil 212 may be well-supported and retained in the first internal groove 176.

The second internal groove 276 may receive the first end 225 of the second biasing foil 230 and the second end 222 of the first biasing foil 220. In some embodiments, the foil arrangement 170 may have an asymmetrical arrangement (e.g., when using a biasing foil 220 with a specific direction of rotation), and the foil arrangement 170 may need to be installed in one particular position about the axis 104. The differently-shaped grooves 176, 276 can aid with installation, for example, such that the grooves 176, 276 engage with the foil arrangement in only that particular position.

The arch-bound top foil 212 may supply the selected radial pre-load to the shaft segment 164. As the shaft segment 164 begins to rotate (e.g., in the clockwise direction along arrow 200), air pressure may cause the second end 216 (i.e., the leading end of the top foil 212) to lift away from the first end 214 as the first end 214 remains seated upon the seat surface 270. As the angular velocity of the shaft segment 164 increases further, the top foil 212 may expand radially outward against the biasing force of the biasing foil member 202 and lift-off the shaft segment 164 such that a thin film of air supports rotation of the rotating group 102. As the shaft segment 164 decelerates, the biasing foil member 202 and the top foil 212 may resiliently return to the state shown in FIG. 3.

Furthermore, during rotation of the shaft member 164, the seat surface 270 may interfere with and limit rotation of the first end 214 in the direction of arrow 200 relative to the journal housing member 160. The first end 214 may, in turn, interfere with such rotational movement of the first end 221 of the first biasing foil 220 to thereby support and limit rotation of the biasing foil member 202. The ends 222, 225 of the biasing foil member 202 may be similarly supported and limited against rotation within the second internal groove 276 as well. Accordingly, the foil arrangement 170 may be retained within the gap 174, for example, such that the biasing foil member 202 and the top foil member 211 are supported and limited against rotation about the axis 104.

It will be appreciated that the bearing system 105 may be highly manufacturable and may provide a number of manufacturing efficiencies. For example, the first and second internal grooves 176, 276 may be formed efficiently and accurately. In some embodiments of a method of manufacturing the bearing system 105, the journal housing member 160 may be provided with the bore 162, and one or both grooves 176, 276 may be subsequently machined into the journal housing member 160.

Figure 4:
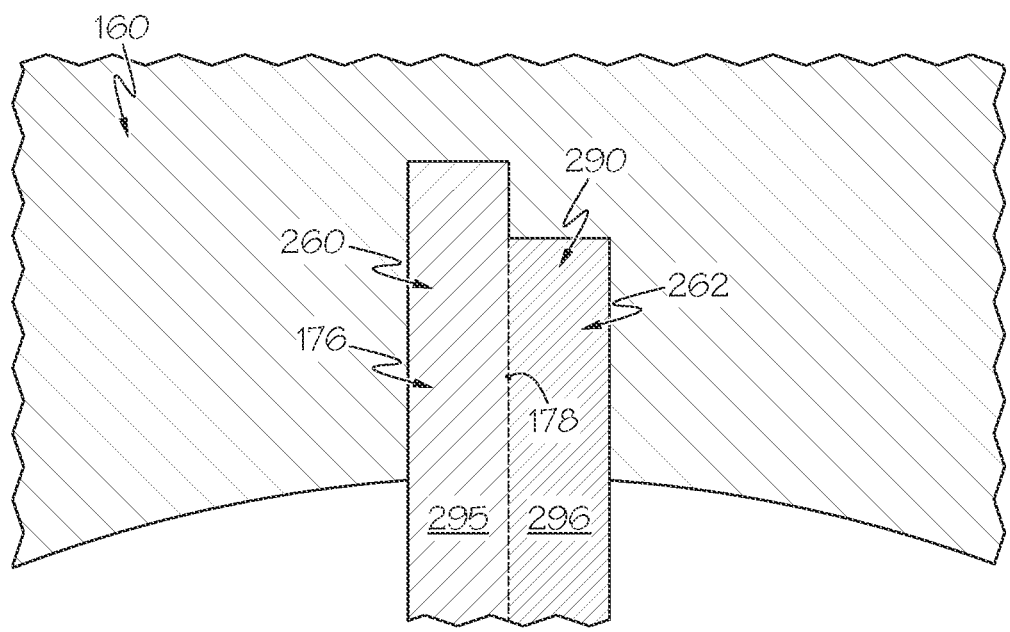
FIG. 4 is a schematic cross-sectional view of a bearing housing illustrating manufacture of the same for the retainer arrangement of FIG. 3.

In some embodiments represented in FIG. 4, at least one of the grooves 176, 276 may be machined into the journal housing member 160 using a broaching tool 290. The broaching tool 290 may be configured for cutting, machining, and broaching the first internal groove 176. The broaching tool 290 may be elongate and may extend along a straight longitudinal axis that is parallel with the axis 104 and the axis 178. The broaching tool 290 may include a plurality of cutting elements, teeth, etc. that are configured to remove material from the journal housing member 160 as the broaching tool 290 moves along the axis 178.

The broaching tool 290 may include a first longitudinal segment (represented at 295) and a second longitudinal segment (represented at 296). The first and second longitudinal segments 295, 296 are shown superimposed on the same cross-sectional plane in FIG. 4; however, it will be appreciated that the first and second longitudinal segments 295, 296 may be arranged longitudinally along the axis 178 in-series on the broaching tool 290. The first longitudinal segment 295 may have cutting elements (e.g., teeth, sharpened elements, etc.) that have a collective profile corresponding to that of the first portion 260 of the first internal groove 176. The second longitudinal segment 296 may have cutting elements with a profile corresponding to that of the second portion 262 of the groove 176.

In some embodiments, the broaching tool 290 may move along the axis 178 such that the first longitudinal segment 295 initially cuts the first portion 260 of the first groove 176. Then, as the broaching tool 290 advances along the axis 178, the second longitudinal segment 296 cuts the second portion 262 of the first groove 176. Accordingly, in some embodiments, the broaching tool 290 may move along the axis 178 relative to the journal housing member 160 and cut both the first and second portions 260, 262 of the first internal groove 176 in a single pass, thereby cutting the first groove 176 efficiently while maintaining cutting accuracy.

Another broaching tool may be configured for broaching the second groove 276. The other broaching tool may have a single, rectangular cross section, in some embodiments, for cutting the U-shaped second groove 276. Again, the broaching operation may increase manufacturing efficiency. For example, the elongate, flat surfaces of the grooves 176, 276 may be formed in a short amount of time and may also be machined to high tolerances.

Once the grooves 176, 276 are formed, the shaft segment 164 may be inserted within the journal housing member 160 with the foil arrangement 170 disposed in the gap 174 and the ends 214, 216, 221, 224, 222, 225 disposed in the grooves 176, 276 as discussed above. Thus, the bearing system 105 may be manufactured and assembled efficiently. As mentioned above, the bearing system 105 may be further installed and incorporated into the turbocharger 100 or another turbomachine.

The embodiments of the bearing system 105 may provide various advantages, some of which are discussed above. The bearing system 105 may provide high-quality, robust, bearing support for a turbomachine. The bearing system 105 may also provide desirable, known, and precise preload, lift-off-speeds, and/or other characteristics. Furthermore, the bearing system 105 may be manufactured and assembled efficiently, in a repeatable fashion, with precision, and at relatively low-cost.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A journal foil bearing system comprising:
  a journal housing member with a bore;
  a shaft received within the bore and supported for rotation about an axis relative to the journal housing member;
  a biasing foil member and a top foil member, the biasing foil member including at least one biasing foil received within the bore and disposed radially between the journal housing member and the shaft, the top foil member including at least one top foil received within the bore and disposed radially between the at least one biasing foil and the shaft; and
  a retainer arrangement that includes:
    an internal groove that extends radially in a depth direction from the bore, the internal groove having a first portion and a second portion, the first portion extends further in the depth direction than the second portion and includes a seat surface; and
    a first top foil end and a second top foil end of the top foil member, the first top foil end configured to abut the second top foil end, the first top foil end received in the first portion of the internal groove and configured to seat against the seat surface to limit rotation of the first top foil end about the axis, the second top foil end received in the second portion of the internal groove.

2. The journal foil bearing system of claim 1, wherein the first portion and the second portion of the internal groove extend substantially radially with respect to the axis; and
  wherein the first top foil end extends further outward radially than the second top foil end.

3. The journal foil bearing system of claim 1, wherein the top foil member includes a single top foil having the first top foil end, the second top foil end, and an intermediate portion that extends between the first top foil end and the second top foil end in a circumferential direction with respect to the axis.

4. The journal foil bearing system of claim 1, wherein the internal groove is defined by a plurality of flat surfaces, one of which is the seat surface.

5. The journal foil bearing system of claim 4, wherein the first portion of the internal groove includes a first recessed surface recessed radially in the depth direction from the bore, a first side surface, and the seat surface; and
  wherein the second portion of the internal groove includes a second recessed surface recessed radially in the depth direction from the bore and a second side surface.

6. The journal foil bearing system of claim 5, wherein the first side surface faces toward the seat surface and the second side surface in a circumferential direction.

7. The journal foil bearing system of claim 6, wherein the first side surface, the seat surface, and the second side surface are flat and parallel to each other.

8. The journal foil bearing system of claim 1, wherein the top foil member includes a single top foil having the first top foil end, the second top foil end, and an intermediate portion that extends between the first top foil end and the second top foil end in a circumferential direction; and
  wherein the first top foil end and the second top foil end extend substantially parallel to each other.

9. The journal foil bearing system of claim 1, wherein the internal groove is a first internal groove, the first internal groove receiving a first biasing foil end of the at least one biasing foil; and
  further comprising a second internal groove, the second internal groove spaced circumferentially from the first internal groove, the second internal groove receiving a second biasing foil end of the at least one biasing foil.

10. The journal foil bearing system of claim 9, wherein the second internal groove has a different cross sectional shape than that of the first internal groove.

11. The journal foil bearing system of claim 1, wherein the internal groove is defined by at least four substantially flat surfaces, one of which is the seat surface.

12. A journal foil bearing system comprising:
  a journal housing member with a bore;
  a shaft received within the bore and supported for rotation about an axis relative to the journal housing member;
  a biasing foil member and a top foil member, the biasing foil member including at least one biasing foil received within the bore and disposed radially between the journal housing member and the shaft, the top foil member including at least one top foil received within the bore and disposed radially between the at least one biasing foil and the shaft;

a retainer arrangement that includes:
an internal groove of the journal housing that extends from the bore, the internal groove having a seat surface; and
a first top foil end and a second top foil end of the top foil member, the first top foil end and the second top foil end extending substantially parallel with the first top foil end extending further than the second top foil end outward from the axis to define a foil seating part of the first top foil end, the first top foil end configured to abut the second top foil end, the first top foil end and the second top foil end received in the internal groove with the foil seating part configured to seat against the seat surface to limit rotation of the first top foil end about the axis.

13. The journal foil bearing system of claim 12, wherein the internal groove includes a first portion and a second portion, and wherein the first portion and the second portion extend substantially radially with respect to the axis.

14. The journal foil bearing system of claim 12, wherein the top foil member includes a single top foil having the first top foil end, the second top foil end, and an intermediate portion that extends between the first top foil end and the second top foil end in a circumferential direction.

15. The journal foil bearing system of claim 12, wherein the internal groove is defined by a plurality of flat surfaces, one of which is the seat surface.

16. The journal foil bearing system of claim 12, wherein the internal groove is defined by at least four substantially flat surfaces, one of which is the seat surface.

17. A method of manufacturing a journal foil bearing system comprising:
providing a journal housing member with a bore and an internal groove that extends radially in a depth direction from the bore, the internal groove having a first portion and a second portion, the first portion extending further in the depth direction than the second portion and including a seat surface;
inserting a shaft within the bore and supporting the shaft with a foil arrangement for rotation about an axis relative to the journal housing member, the foil arrangement including a biasing foil member and a top foil member, the biasing foil member including at least one biasing foil received within the bore and disposed radially between the journal housing member and the shaft, the top foil member including at least one top foil received within the bore and disposed radially between the at least one biasing foil and the shaft with respect to the axis; and
retaining the top foil member, including abutting a first top foil end and a second top foil end of the top foil member, positioning the first top foil end in the first portion of the internal groove, seating the first top foil end against the seat surface to limit rotation of the first top foil end about the axis, and positioning the second top foil end in the second portion of the internal groove.

18. The method of claim 17, further comprising forming the internal groove.

19. The method of claim 18, wherein forming the internal groove includes broaching the internal groove into the journal housing member.

20. The method of claim 19, wherein broaching the internal groove includes broaching the first portion and the second portion of the internal groove with a single pass of a broaching tool.

* * * * *